United States Patent
Henin

(10) Patent No.: US 8,196,252 B2
(45) Date of Patent: Jun. 12, 2012

(54) WINDSCREEN WIPER DEVICE

(75) Inventor: Pierre Henin, Bellefontaine (BE)

(73) Assignee: Federal-Mogul S.A., Aubange (BE)

( * ) Notice: Subject to any disclaimer, the term of this patent is extended or adjusted under 35 U.S.C. 154(b) by 852 days.

(21) Appl. No.: 11/817,719

(22) PCT Filed: Feb. 9, 2006

(86) PCT No.: PCT/EP2006/050819
§ 371 (c)(1),
(2), (4) Date: Sep. 16, 2008

(87) PCT Pub. No.: WO2006/092356
PCT Pub. Date: Sep. 8, 2006

(65) Prior Publication Data
US 2009/0013492 A1    Jan. 15, 2009

(30) Foreign Application Priority Data
Mar. 2, 2005  (EP) .................................. 05101596

(51) Int. Cl.
*B60S 1/38* (2006.01)
(52) U.S. Cl. ............ 15/250.201; 15/250.43; 15/250.452
(58) Field of Classification Search ............... 15/250.43, 15/250.44, 250.201, 250.451–250.454, 250.361
See application file for complete search history.

(56) References Cited

U.S. PATENT DOCUMENTS

| | | | | | |
|---|---|---|---|---|---|
| 2,782,443 | A | * | 2/1957 | Krohm | 15/250.452 |
| 3,116,507 | A | * | 1/1964 | Scinta | 15/250.451 |
| 5,493,750 | A | * | 2/1996 | Bollen et al. | 15/250.452 |
| 6,944,905 | B2 | * | 9/2005 | De Block et al. | 15/250.201 |

FOREIGN PATENT DOCUMENTS

| | | | |
|---|---|---|---|
| DE | 10139104 A1 | | 3/2003 |
| EP | 1491416 | * | 12/2004 |
| EP | 1491416 A1 | | 12/2004 |
| WO | WO 2004/056623 | * | 7/2004 |

\* cited by examiner

*Primary Examiner* — Gary Graham
(74) *Attorney, Agent, or Firm* — Robert L. Stearns; Dickinson Wright, PLLC

(57) ABSTRACT

A windscreen wiper device includes an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, and wherein neighboring ends of longitudinal strips are interconnected by a respective connecting piece with the special feature that connecting piece comprises a channel for a part of wiper blade that extends from strips in a direction away from the windscreen to be wiped, wherein channel comprises retaining means for retaining connecting piece onto wiper blade.

8 Claims, 5 Drawing Sheets

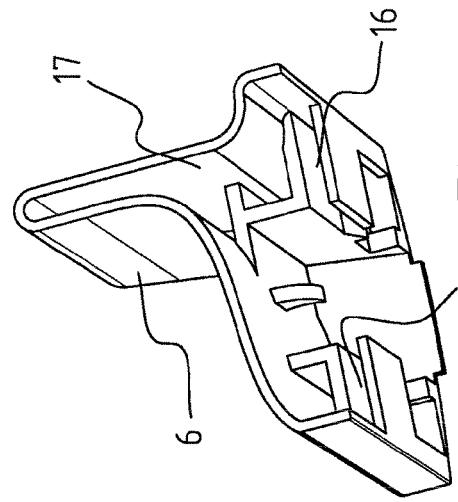
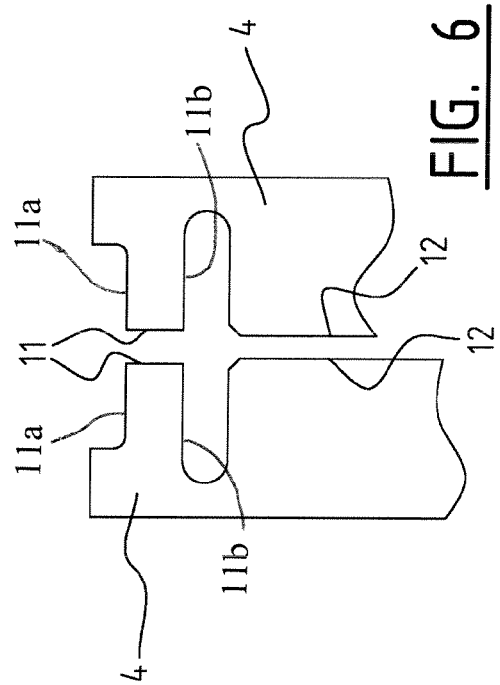
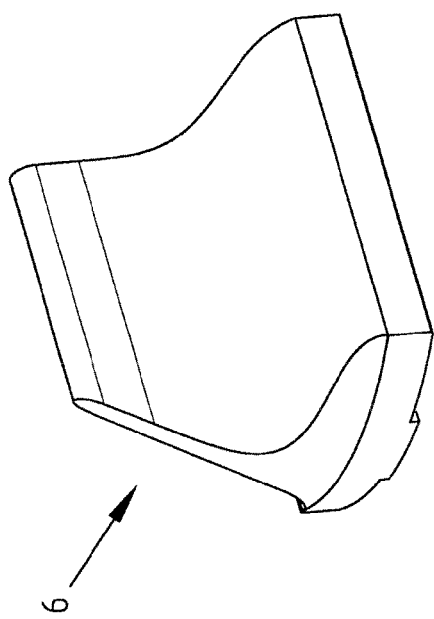

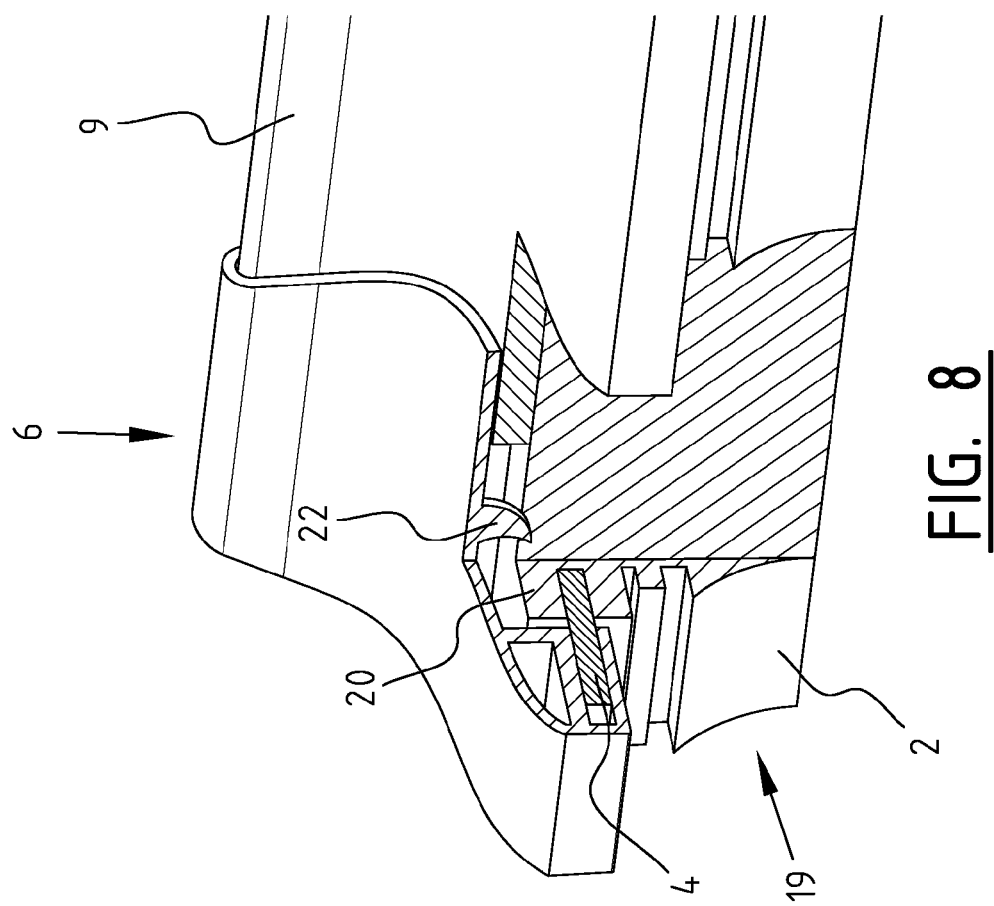
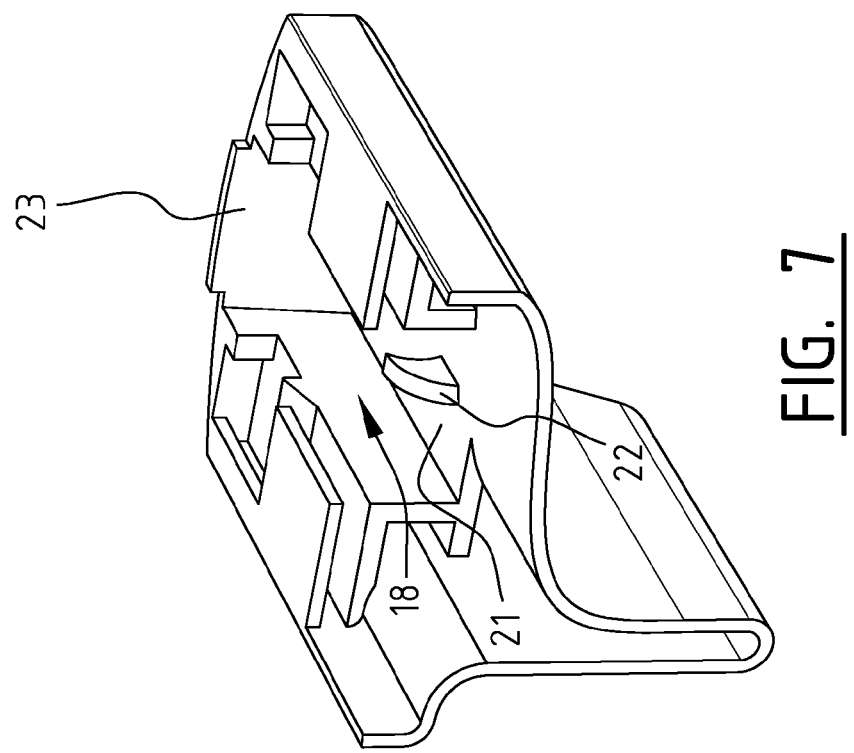

WINDSCREEN WIPER DEVICE

BACKGROUND OF THE INVENTION

1. Technical Field

The invention relates to a-windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of longitudinal strips are interconnected by a respective connecting piece, which windscreen wiper device comprises a connecting device for an oscillating wiper arm, wherein at least one connecting piece comprises engaging members engaging around the longitudinal strips so that strips are mounted in grooves formed by engaging members.

2. Related Art

Such a windscreen wiper device is known form European patent publication no. 1 491 416 in the name of the same Applicant. The prior art windscreen wiper device is in particular designed as a "yokeless" wiper device, wherein use is no longer made of several yokes pivotally connected to each other, but wherein the wiper blade is biased by the carrier element, as a result of which it exhibits a specific curvature. According to the prior art connecting piece is slided over the neighboring ends of strips—or vice versa, that is the neighboring ends of strips are slided into connecting piece—so that a reliable snap connection between these parts is realized. In the prior art connecting piece is provided with an opening at its free end so that the wiper blade can freely slide through connecting piece. In other words, the connecting pieces do not retain the wiper blade, so that connecting pieces allow a relative movement of the wiper blade along the longitudinal strips in the connecting pieces.

One drawback of the prior art windscreen wiper device is the fact that the connecting pieces (in practice also called "end caps") and the wiper blade are not connected in a durable, solid manner. Particularly, when a spoiler is only retained onto strips (and not onto an upper part of the wiper blade facing away from the windscreen to be wiped), the wiper blade may come loose from the connecting pieces. As a result, the life span of the prior art windscreen wiper device may be seriously shortened.

A windscreen wiper device is known from German patent publication no. 101 39 104 (Valeo). An end wall of the connecting piece as depicted in FIG. 5a thereof could be seen as retaining the connecting piece onto the wiper blade.

SUMMARY OF THE INVENTION

The object of the invention is to overcome this drawback of the prior art as indicated above, in particular to provide a windscreen wiper device wherein the wiper blade may not come loose from the connecting pieces ("end caps").

In order to accomplish that objective, a windscreen wiper device according to the invention includes at least one downwardly extending gripping tooth for gripping art of wiper blade.

Preferably, gripping tooth is in the form of a hook. In another preferred version, hook is bent in a direction away from connecting device. In the latter case, any movement of wiper blade in a direction towards connecting piece may be blocked by an end wall of connecting piece, whereas any movement of wiper blade in a direction away from connecting piece is blocked by hook. In other words, because hook and end wall being preferably present in one connecting piece at one end of wiper blade are responsible for blockage of wiper blade in two directions, the connecting piece at the other end of wiper blade pay have an opening at its free end. Preferably, hook is in one piece with connecting piece, whereas hook extends downwardly from a base of channel.

During assembly of the present windscreen wiper device connecting piece and strips are interconnected particularly with the help of a snap connection, wherein strips are slided into grooves formed by engaging members, and wherein a free end of part of wiper blade is slidably mounted in channel. Retaining means ensure that free end will stay into connecting piece at all times. In the alternative connecting piece is glued or welded onto strips.

In one preferred embodiment of a windscreen wiper device according to the invention retaining means comprises an end wall of channel. In other words, the connecting pieces at both ends of the wiper blade may be equipped with a respective end wall of that channel for blocking any movement of the wiper blade in a direction away from the connecting device and in a direction towards the connecting device. Preferably, the end wall of channel forms an end wall of connecting piece.

In another preferred embodiment of a windscreen wiper device in accordance with the invention (in case strips at connecting piece are slidably connected by means of a snap connection comprising laterally extending means on strips) laterally extending means comprise at least one protrusion extending laterally from a longitudinal edge of each strip, protrusion being located between stops on the connecting piece.

In another preferred embodiment of a windscreen wiper device according to the invention laterally extending means comprise at least two stops extending laterally from a longitudinal edge of each strip, stops being located on opposite sides of a protrusion on the connecting piece. Particularly, laterally extending means extend laterally from the interior longitudinal edge of each strip. In the alternative, laterally extending means extend laterally from the exterior longitudinal edge of each strip.

In another preferred embodiment of a windscreen wiper device in accordance with the invention the engaging members are integral with connecting piece. The connecting piece is particularly made in one piece of plastic.

In another preferred embodiment of a windscreen wiper device according to the invention a spoiler is provided, wherein an end of spoiler is mounted in connecting piece. The spoiler is preferably a separate constructional element being entirely detachably connected to the wiper blade, wherein the connecting piece can be slided over spoiler end.

The invention will now be explained in more detail with reference to figures illustrated in a drawing, wherein:

FIGS. 2 through 6 show details of the windscreen wiper device of FIG. 1; and FIGS. 7 through 10 reveal several retaining means inside connecting pieces of the windscreen wiper device of FIG. 1 in order to retain the connecting pieces onto the wiper blade.

Figure 1:
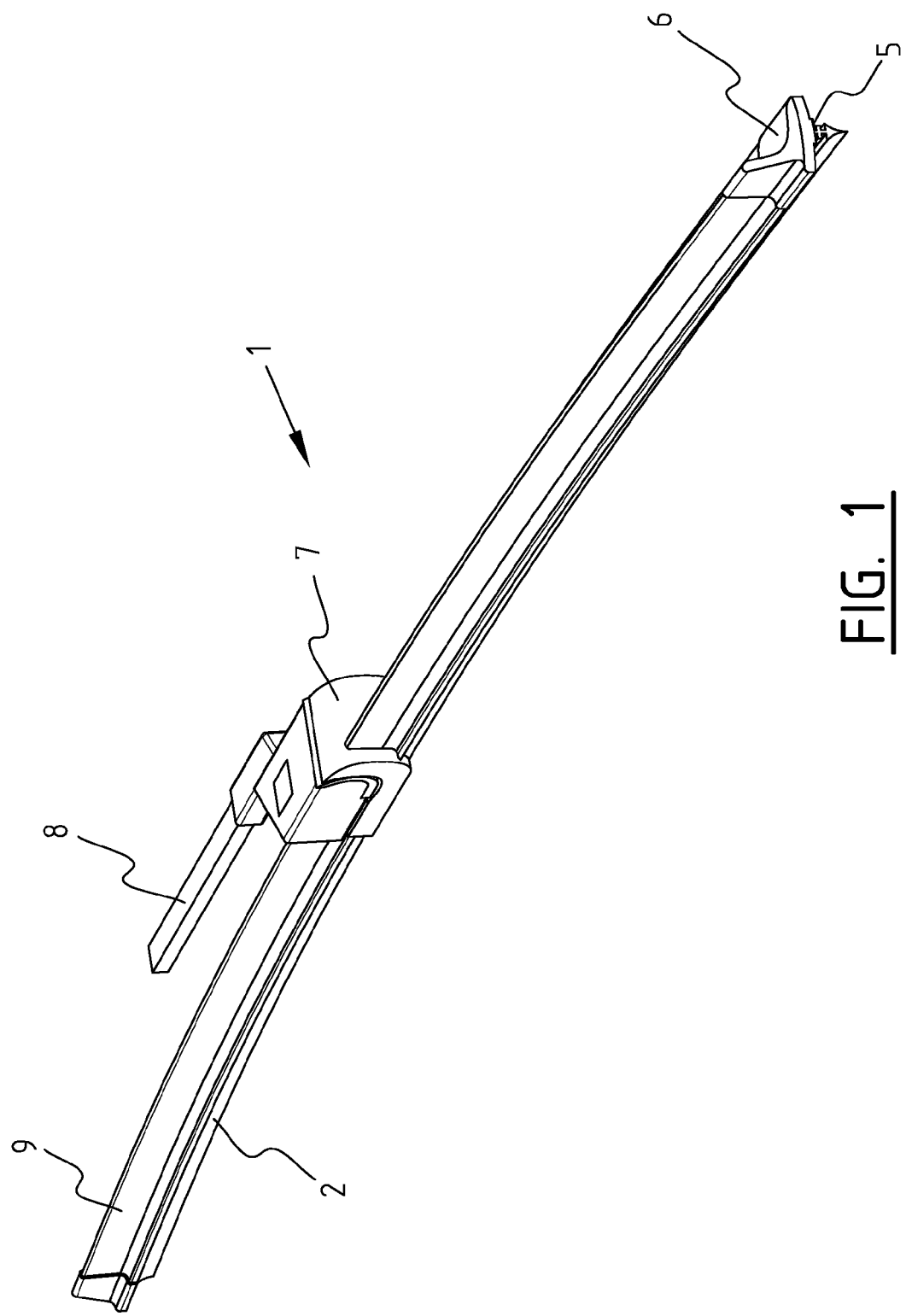
FIG. 1 is a perspective, schematic view of a preferred embodiment of a windscreen wiper device according to the invention.

FIG. 1 shows a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biased in a curved position (the curvature in operative position being that of a windscreen to be wiped). Neighbouring ends 5 of strips 4 are interconnected on either side of the windscreen wiper device 1 by means of connecting pieces 6. The windscreen wiper device 1 is further equipped with a connecting device 7 for an oscillating arm 8, and a spoiler 9.

Figure 2:
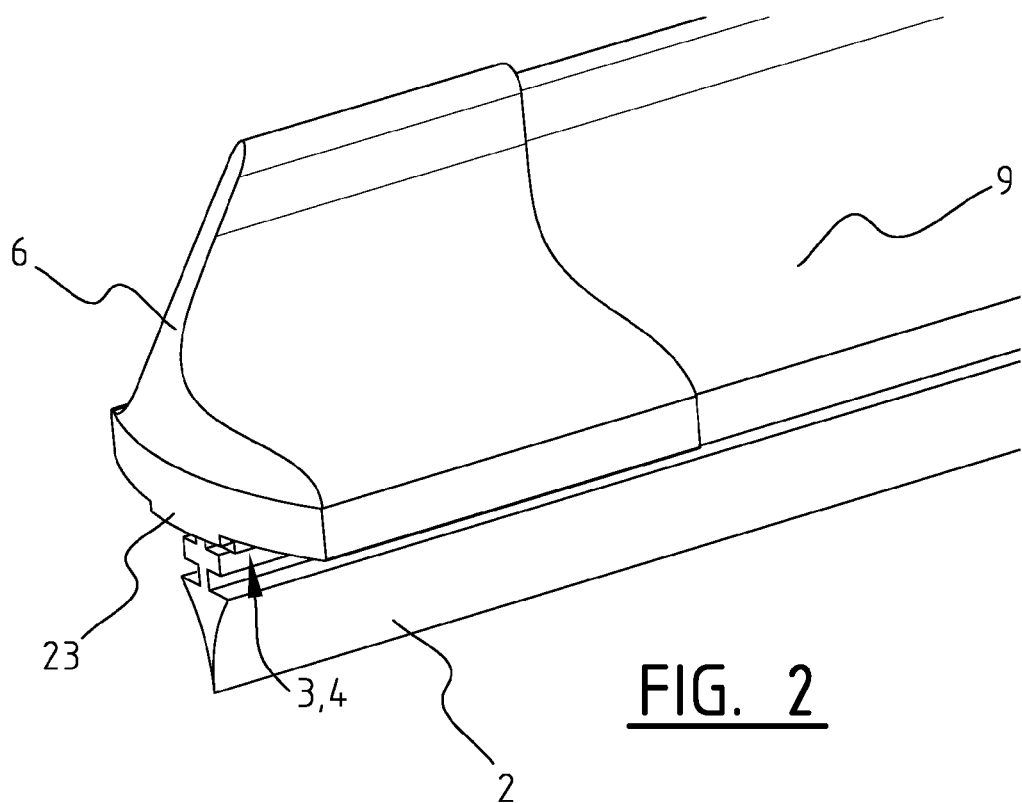
Figure 3:
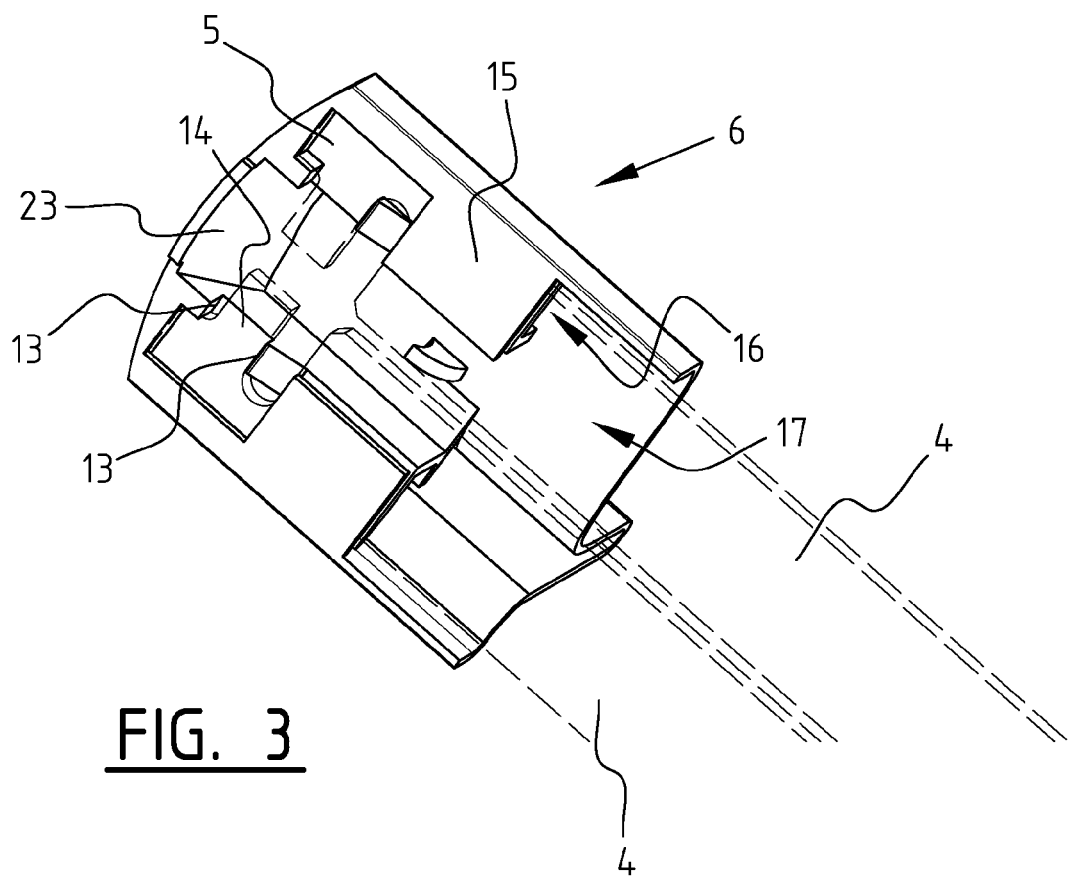

FIG. 2 shows a free end of the windscreen wiper device 1 of FIG. 1, whereas FIG. 3 reveals a bottom view of said free end without the wiper blade 2 being present. Corresponding parts have been designated with the same reference numerals. As can be seen from FIGS. 2, 4 and 5 (the latter two figures showing in perspective the connecting piece 6 as a separate constructional element), the connecting piece 6 at one end of the wiper blade 2 is closed in the sense that it has an end wall 23 in order to block a relative movement of the wiper blade 2 along the strips 4 inside the connecting piece 6 (in a direction towards said connecting piece 6) during use. The connecting pieces 6 are both made of one piece of plastic.

With reference to FIG. 6 relating to a top view of the strips 4 as such, the strips 4 are each provided with a protrusion 11 extending laterally from a longitudinal interior edge 12 of the strips 4. When a connecting piece 6 is slidably mounted onto the neighbouring ends 5 of the strips 4, a snap or clicking connection is realized, wherein the protrusions 11 are snapped or clicked between stops 13 ("notches 13") inside the connecting piece 6. Each protrusion 11 rests in a small groove 14 between these opposing stops 13 of the connecting piece 6, and the protrusions 11 include two stops 11a, 11b extending laterally from a longitudinal edge of each strip 4 that interact with the stops 13 of the connecting piece 6. Accordingly, the strips 4 are blocked against any movement in longitudinal direction with respect to the connecting pieces 6. Each connecting piece 6 is also provided with two engaging member 15 made integral therewith, wherein the engaging members 15 engage around the strips 4 so as to form a groove 16 for sliding the strips 4 therein. The engaging members 15 ensure that the strips 4 are blocked against any movement in transversal direction with respect to the connecting pieces 6. Each connecting piece 6 has a cavity 17 to accommodate the free end of the spoiler 9.

The stop 13 facing away from the free end of the connecting piece 6 is equipped with an inclined upper surface, so that sliding said connecting piece 6 onto the strips 4 does not take too much force, whereas once the protrusion 11 rests inside said groove 14 dismounting the connecting piece 6 from the strips 4 cannot take place easily. The stop 13 facing towards the free end of the connecting piece 6 also ensures that the strips are kept at a mutual constant distance, as the upper end of each strip 4 is located between said stop 13 and a (side) wall of the connecting piece 6.

Figure 10:
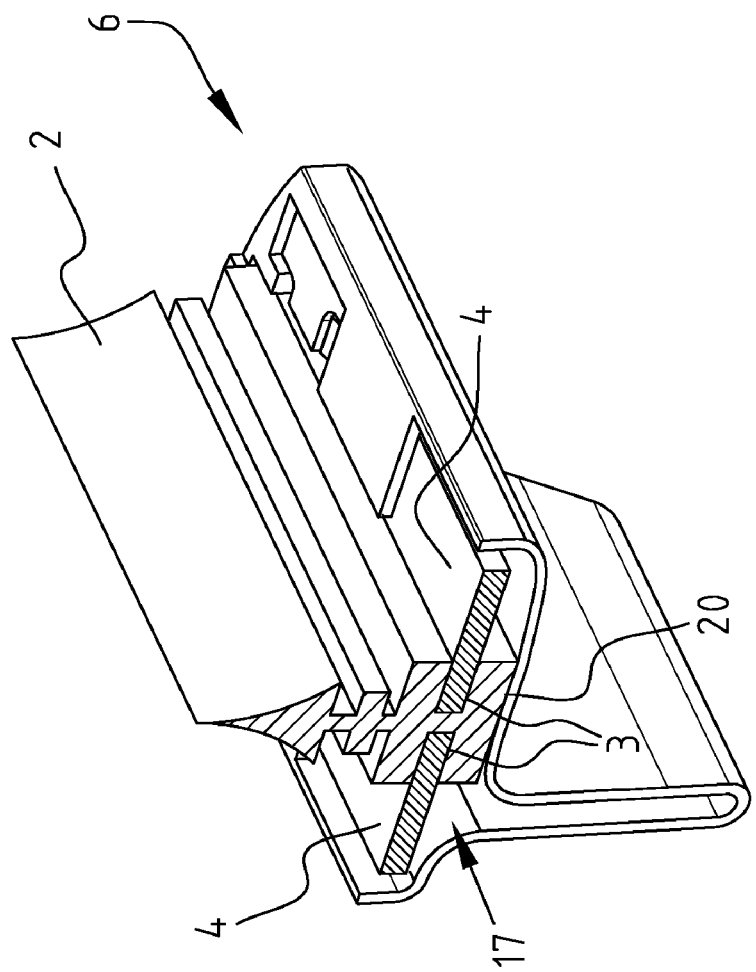
Figure 9:
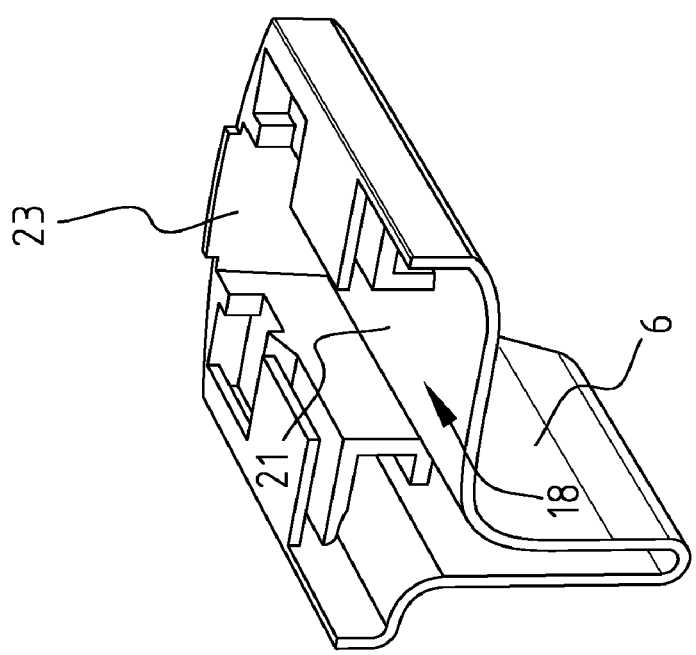

As can be seen from FIGS. 7 and 8, the connecting piece 6 at one end of the wiper blade 2 comprises a channel 18 for slidably inserting therein the free end 19 of an upper part 20 of said wiper blade 2. In use said upper part 20 extends from the strips 4 in a direction away from the windscreen to be wiped. In one preferred embodiment (FIG. 7) a base 21 of said channel 18 is provided with a downwardly extending hook 22 made in one piece therewith. Said hook 22 is bend in a direction away from the connecting device 7, so that any movement of said wiper blade 2 in a direction towards said connecting piece 6 is blocked by the end wall 23 of said connecting piece 6, whereas any movement of said wiper blade 2 in a direction away from said connecting piece 6 is blocked by said hook 22. The connecting piece 6 at the other end of the wiper blade 2 may have an opening at its free end, because the connecting piece at the one end of the wiper blade 2 ensures blockage of the wiper blade in said two directions. It is noted that the hook 22 only slightly penetrates the elastomeric (rubber) material of said upper part 20 of said wiper blade 2, without damaging the same. FIGS. 9 and 10 correspond to FIGS. 7 and 8, respectively, wherein in a preferred embodiment an end wall 23 of said channel 18 of both connecting pieces 6 (i.e. at both ends of said wiper blade 2) ensures that any movement of the wiper blade 2 in a direction away from the connecting device 7 or in a direction towards the connecting device 7 is blocked. Thus, without the hook 22 being present said wiper blade 2 is retained onto both connecting pieces 6 at all times, thereby avoiding the risk that said wiper blade 2 may come loose from the connecting pieces 6.

The present invention is not limited to the embodiment shown, but extends also to other embodiments falling within the scope of the appended claims.

The invention claimed is:

1. A windscreen wiper device comprising an elastic, elongated carrier element, as well as an elongated wiper blade of a flexible material having a wiping edge, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by respective pairs of connecting pieces, which windscreen wiper device includes a connecting device for attachment to an oscillating wiper arm, wherein each of said connecting pieces includes a connecting channel in which a part of said wiper blade that projects from said strips in a direction away from said wiping edge extends, wherein said connecting channel includes a base wall and at least one gripping tooth projecting into said connecting channel from said base wall and directly gripping said part of said wiper blade, and wherein each of said connecting pieces further includes a spoiler portion having a spoiler cavity configured to receive an end of a spoiler of said wiper device, and wherein said spoiler cavity is separated from said connecting channel by said base wall.

2. A windscreen wiper device according to claim 1, wherein said at least one gripping tooth of said each of said connecting pieces is in the form of a hook.

3. A windscreen wiper device according to claim 2, wherein said hook is bent in a direction away from each of said associated connecting pieces.

4. A windscreen wiper device according to claim 1, wherein said connecting pieces each include an end wall.

5. A windscreen wiper device according to claim 1, wherein said strips and said connecting pieces are slidably connected by means of a snap connection comprising laterally extending means on said strips.

6. A windscreen wiper device according to claim 5, wherein said laterally extending means comprise at least one protrusion extending laterally from a longitudinal edge of each strip, said protrusion being located between stops on each of said connecting pieces.

7. A windscreen wiper device according to claim 5, wherein said laterally extending means comprise at least two stops extending laterally from a longitudinal edge of each strip, said stops being located on opposite sides of a protrusion on each of said connecting pieces.

8. A windscreen wiper device according to claim 5, wherein said laterally extending means extend laterally from an interior longitudinal edge of each strip.

\* \* \* \* \*

UNITED STATES PATENT AND TRADEMARK OFFICE
CERTIFICATE OF CORRECTION

| | | |
|---|---|---|
| PATENT NO. | : 8,196,252 B2 | Page 1 of 1 |
| APPLICATION NO. | : 11/817719 | |
| DATED | : June 12, 2012 | |
| INVENTOR(S) | : Pierre Henin | |

It is certified that error appears in the above-identified patent and that said Letters Patent is hereby corrected as shown below:

Column 1, Line 46-49, the following is deleted "A windscreen wiper device is known from German patent publication no. 101 39 104 (Valeo). An end wall of the connecting piece as depicted in FIG. 5a thereof could be seen as retaining the connecting piece onto the wiper blade.".

Signed and Sealed this
Sixth Day of November, 2012

David J. Kappos
*Director of the United States Patent and Trademark Office*